United States Patent [19]
Ishiguro et al.

[11] Patent Number: 4,935,613
[45] Date of Patent: Jun. 19, 1990

[54] LIGHT PROJECTING TYPE DISTANCE MEASURING APPARATUS

[75] Inventors: Minoru Ishiguro; Minoru Takahashi, both of Saitama, Japan

[73] Assignee: Fuji Photo Film Co., Ltd., Kanagawa, Japan

[21] Appl. No.: 224,703

[22] Filed: Jul. 27, 1988

[30] Foreign Application Priority Data

Jul. 31, 1987 [JP] Japan .................. 62-191688

[51] Int. Cl.$^5$ ................................. G01V 1/20
[52] U.S. Cl. ......................... 250/201.1; 354/403; 356/4
[58] Field of Search ............... 250/560, 561, 201 AF; 356/1, 4, 5, 28; 354/403

[56] References Cited

U.S. PATENT DOCUMENTS

| | | | |
|---|---|---|---|
| 4,429,967 | 2/1984 | Tokuda et al. | 356/4 |
| 4,642,451 | 2/1987 | Tsunekawa et al. | 250/201 |
| 4,673,274 | 6/1987 | Nagaoka et al. | 354/403 |
| 4,758,082 | 7/1988 | Kozuki et al. | 354/403 |
| 4,768,876 | 9/1988 | Okino | 356/4 |

*Primary Examiner*—David C. Nelms
*Attorney, Agent, or Firm*—Young & Thompson

[57] ABSTRACT

A distance measuring apparatus has a light projector unit for generating a plurality of light pulses at predetermined intervals and for projecting them upon an object, and a light receiving unit for receiving the light reflected by the object and outputting a photoelectrically converted signal. A photoelectrically converted signal generated in response to at least a first light pulse of said light pulses is inputted to a comparator wherein it is compared with a predetermined voltage to judge which is larger. The gain of an amplifier or the light emission intensity of the light projector unit is adjusted in accordance with the signal level judged. After adjustment, the light pulses of principal emission following the pre-emission are projected and the reflected light pulses are photoelectrically converted by the light receiving unit. The photoelectrically converted signal of each light pulse is amplified by the amplifier and thereafter integrated. The position of a taking lens is calculated in accordance with the integrated value.

20 Claims, 3 Drawing Sheets

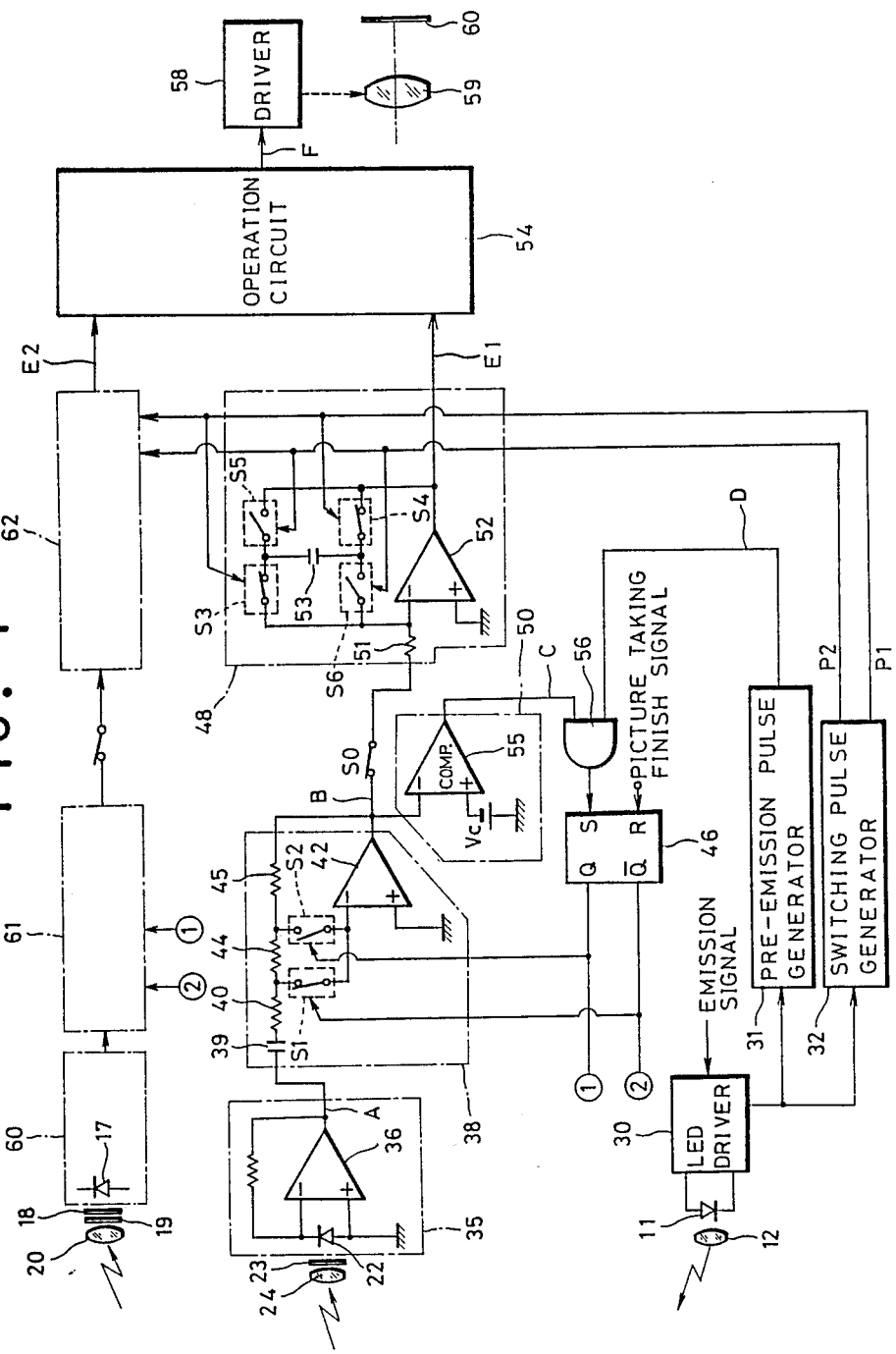

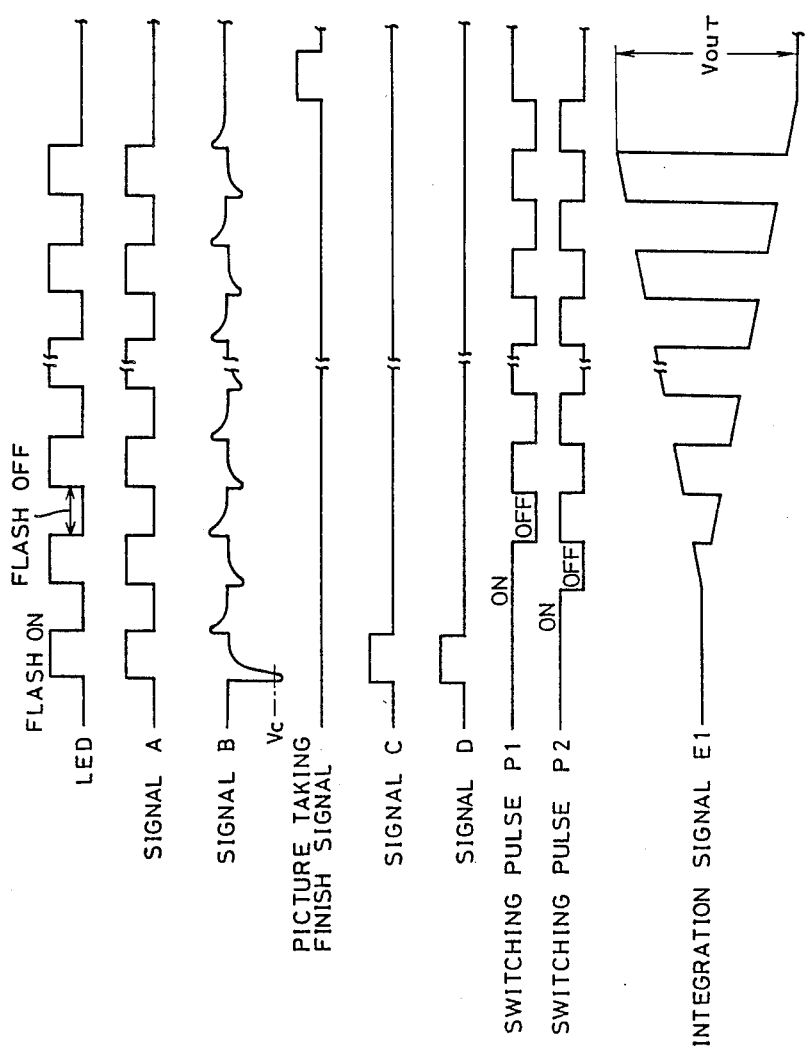

LIGHT PROJECTING TYPE DISTANCE MEASURING APPARATUS

BACKGROUND OF THE INVENTION

1. Field of the Invention

The present invention relates to a distance measuring apparatus for use in a photographic or electric camera and the like, and more particularly to a distance measuring apparatus for measuring the distance of an object while applying pulsating light having a predetermined period to the object.

2. Description of the Prior Art

Distance measuring apparatus are mounted nowadays on still cameras and video cameras. Among such apparatus, there is known a light projecting type distance measuring apparatus whereby light is directed to an object, light reflected from the object is received by a light receiving area of the camera, and the position of the reflected light incident upon the light receiving area is used to measure the distance to the object. This measuring method is advantageous in that even if the brightness of an object is low, the measurement can be performed correctly.

FIG. 4 shows an example of a conventional light projecting type distance measuring apparatus. A light projecting unit 10 is comprised by an LED 11 for emitting near-infrared rays and a light projector lens 12. Upon depressing a shutter release button by half the full stroke, the light projecting unit 10 projects a spot of light or a line of light upon an object 14 to be photographed. A first light receiving unit 16 is comprised by a light reception element 17, a mask 18 coupled to the light reception element at the front surface thereof, an IR filter 19 for passing only near-infrared rays, and a light reception lens 20. A second light receiving unit 21 is constructed of a light reception element 22, an IR filter 23, and a light reception lens 24.

The first and second light receiving units 16 and 21 are spaced by predetermined distances from the light projecting unit 10 so that the position of reflected light incident thereon varies with the object distance. Since the mask 18 with a light shielding area 18a of a sawtooth shape as shown in FIG. 5 is coupled to the light reception element 17 at the front surface thereof, a photoelectrically converted signal representative of the strength and incident position of reflected light is outputted from the light reception element 17. Since the second light receiving unit 21 uses no mask, a photoelectrically converted signal representative of only the brightness of the reflected light is obtained from the light reception element 22.

The photoelectrically converted signals are inputted via respective amplifiers 25 and 26 to an operation section 27. The operation section 27 calculates a signal ratio between the two photoelectrically converted signals and outputs a lens set position signal which corresponds to the signal ratio and depends only on the object distance. Upon depressing further the release button, the picture taking lens is moved to the position corresponding to the lens set position signal and thereafter, the shutter is actuated to expose a photographic film.

Near-infrared rays contained in ambient light are also incident on the first and second light receiving units 16 and 21. Therefore, the photoelectrically converted signals obtained by the light reception elements 17 and 22 contain the components of ambient light which decrease the precision of measurement. This problem can be solved based on the fact that most of the components of ambient light are DC components. Accordingly, a predetermined number of light pulses are generated by the light projecting unit 10 at constant intervals, and only the AC component of the photoelectrically converted signals from the light receiving units is derived. To this end, it is possible to provide a system wherein chopper amplifiers and an integrator are used in place of the above-described amplifiers 25 and 26, the DC component contained in the photoelectrically converted signals from the light receiving units 16 and 21 is removed, and thereafter the remaining AC component is integrated to detect a measured distance signal based on the integrated value.

The above distance measuring apparatus uses a trigonometric distance measurement method, wherein the incident light reflected from an object is detected based on the amplitude of a photoelectrically converted signal from the light receiving unit. Therefore, to measure a distance more precisely, small photoelectrically converted signals from the first and second light receiving units 16 and 21 are amplified to the extent that noises are not superposed thereon, whereas too great photoelectrically converted signals are applied to the amplifiers with reduced gain factors so as not to saturate the amplifiers and the integrator. To do this, in a video camera provided with distance measuring apparatus of the above type, the gain factor of the amplifiers is arranged to be changed in accordance with the output levels of the photoelectrically converted signals obtained during the previous distance measurement operation.

The above-described method of changing the gain factor is effective for the case wherein the same object is continuously photographed, as with a video camera; but it cannot be used for the case wherein the object frequently changes, as with a still camera. In particular, if a still camera is used, a distance measurement must be performed every time the object is changed, without referring to the results of the previous distance measurement operation. In addition, the distance measurement must be made quickly. Thus, the conventional method applicable to video cameras is not practical for still cameras.

OBJECT OF THE INVENTION

An object of the present invention is to provide a distance measuring apparatus capable of quickly setting the levels of photoelectrically converted signals at suitable levels for an object whose distance is to be measured.

SUMMARY OF THE INVENTION

The above and other objects and advantages of this invention can be achieved by a distance measuring apparatus according to the invention, wherein among the photoelectrically converted signals outputted from the light receiving units, the photoelectrically converted signals responsive to a pre-emission are picked up to adjust the gain factors of the amplifiers for amplifying photoelectrically converted signals, or to adjust the light emission intensity of the light projecting unit before a principal emission following the pre-emission, thereby setting the photoelectrically converted signals at proper levels.

In a preferred embodiment of this invention, the pre-emission is a first light pulse. The pre-emission may comprise a plurality of pre-emitted light pulses, such as first and second light pulses, or first to third light pulses.

BRIEF DESCRIPTION OF THE DRAWINGS

The above and other features and advantages will become more apparent from the following detailed description when read in connection with the accompanying drawings, wherein:

FIG. 1 is a circuit diagram showing an embodiment of the present invention wherein the gain of a differential amplifier is switched between two different values;

FIG. 2 is a timing chart showing waveforms at various circuit points of FIG. 1;

DETAILED DESCRIPTION OF THE INVENTION

Figure 4:
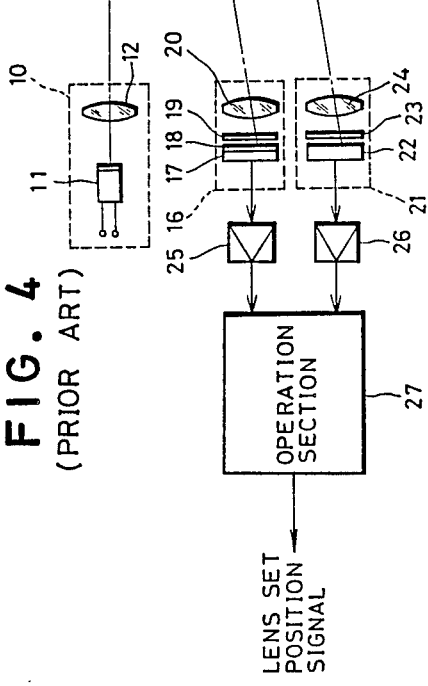
FIG. 4 is a schematic diagram showing the structure of a conventional active-type distance measuring apparatus.

FIG. 1 shows an example of a circuit used with the distance measuring apparatus of this invention. The optical system of the apparatus of this invention is the same as that shown in FIG. 4, so that components similar to those shown in FIG. 4 are designated by using identical reference numerals. An LED driver 30 is actuated in synchronism with the depression of a release button (not shown) to cause an LED 11 to flash at a predetermined period and emit spots or lines of pulsating light comprised of near-infrared rays. The pulsating light is projected upon an object to be photographed from a projector lens 12. The LED driver 30 generates a pulse signal in synchronism with the light emission and supplies it to a pre-emission pulse generator 31 and to a switching pulse generator 32. The pre-emission pulse generator 31 generates a rectangular signal D in synchronism with the first light pulse emitted from the LED 11. The switching pulse generator 32 generates two switching pulses P1 and P2 opposite in phase as shown in FIG. 2 in synchronism with the pulse signal from the LED driver 30.

A light detecting unit 35 for detecting light reflected from an object is comprised by a light reception element 17 and an operational amplifier 36 whose output terminal is coupled to a differential amplifier 38. The differential amplifier 38 is comprised by a large capacitor 39 for efficiently utilizing a photoelectrically converted signal A, a resistor 40, an operational amplifier 42, resistors 44 and 45, and switches S1 and S2 for switching the gain of the operational amplifier 42. The switches S1 and S2 may be semiconductor switches such as switching transistors, and are selectively turned on in response to a signal from output terminal Q or $\overline{Q}$ of a flip-flop 46.

The output terminal of the differential amplifier 38 is coupled to a signal level detector 50 and to an integrator 48 via a switch S0. The integrator 48 is comprised by a resistor 51, an operational amplifier 52, an integration capacitor 53, and bridge-connected switches S3 to S6. The switches S3 to S6 are comprised by semiconductor switches in the same manner as the switches S1 and S2. A pair of switches S3 and S4 and a pair of switches S5 and S6 are alternately turned on and off in response to the switching pulses P1 and P2 from the switching pulse generator 32. The switch S0 is caused to turn on just before the second light pulse is emitted by the LED 11 and to turn off when the LED 11 stops its light emission. When the switch S0 turns on, the integrator 48 starts its integration to send a resultant integration signal E1 to an operation circuit 54.

The signal level detector 50 comprises a comparator 55 which compares a reference voltage Vc with a signal B. The comparator 55 outputs an "H" signal when the voltage signal V is equal to or less than the reference voltage Vc. The output from the comparator 50 is supplied to one input terminal of an AND gate 56, the other input terminal thereof being supplied with a signal D from the pre-emission pulse generator 31.

Similar to the light reception element 22, the signal processing circuit for a light reception element 17 is comprised by a light detection unit 60, a differential amplifier 61, and an integrator 62. An integration signal E2 outputted from the signal processing circuit is sent to the operation circuit 54.

The operation circuit 54 calculates the ratio between the integration signals E1 and E2 to obtain a lens setting position signal F based on the calculated ratio. The obtained lens setting position signal F is sent to a driver 58 which adjusts the set position of a picture taking lens 59 in accordance with the object distance, in the known manner. The taking lens 59 focusses the object image on a photographic film 60 while a shutter (not shown) is opened. As is well known, the first light receiving unit including the light reception element 17, the second light receiving unit including the second light reception element 22, and the light projecting unit including the LED 11 are mounted on the front side of the camera body (not shown).

The operation of the apparatus of the above embodiment will be described with reference to FIG. 2. The switches S1 and S2 are initially maintained on and off respectively, and the gain of the operational amplifier 42 is maintained high (G1). All the switches S3 to S6 of the integrator 48 are maintained on since the switching pulses P1 and P2 are still not generated as shown in FIG. 2, so that the capacitor 53 is shorted. It is preferably that a discharge resistor of low resistance (not shown) be provided in both side arms between switches S3 and S6, and S4 and S5. The switch S0 is maintained off. Similarly, the corresponding switches (not shown) of the first light receiving unit are maintained at the same settings.

Initially, upon depressing the release button half its stroke, a light emission signal is outputted from the control circuit (not shown) in the camera and inputted to the LED driver 30. Upon reception of the emission signal, the LED driver 30 drives the LED 11 at a frequency of, e.g., about 5 KHz thereby to emit a predetermined number of light pulses including a pre-emission of a first light pulse. The pre-emission may not only involve the first light pulse but also a second or even also a third light pulse in addition to the first light pulse. In synchronism with this pre-emission, the pre-emission pulse generator 31 generates the rectangular signal D which is in turn inputted to the AND gate 56.

The LED 11 generates near-infrared rays having a duration of about 0.1 msec. and projects them onto the object to be photographed, via the projector lens 12. The near-infrared light reflected from a portion of the object impinges on the light reception element 2 of the second light receiving unit via the lens 24. Thus, the signal A is outputted from the operational amplifier 36.

The signal A is inputted to and amplified by the differential amplifier 38 which has a high gain because of the turning-on of the switch S1.

If an object is positioned in the near range or if it is highly reflective, the output signal B of the differential amplifier 38 will saturate and a correct measurement will not ensure. In order to properly set the gain of the differential amplifier 38, the output signal B of the differential amplifier 38 at the time of the pre-emission is sent to the comparator 55 wherein it is compared with the reference voltage Vc to judge which voltage is larger. The comparator 55 outputs the "H" signal C when the peak value of the output signal B exceeds the reference voltage Vc, and the signal C is inputted to one input terminal of the AND gate 56. The other input terminal thereof is supplied with the signal D in synchronism with the pre-emission of the LED 11, and the output of the AND gate 56 becomes "H" with the signal C being inputted thereto. Then the flip-flop 46 is set to accordingly output an "H" signal from the Q output terminal and an "L" signal from the output terminal $\overline{Q}$. As a result, the switches S1 and S2 connected to the input terminal of the differential amplifier 38 are caused to turn off and on, respectively, so that the gain of the operational amplifier 42 is switches to a low gain (G2). In a similar manner, the gain of the differential amplifier 61 is also changed.

Switching the gains of the differential amplifiers 38 and 61 is performed between the first light pulse emission (pre-emission) and the second light pulse emission of the LED 11. During the time when the main emissions, i.e., those subsequent to the pre-emission pulse or pulses are emitted, the output signal B of the differential amplifier 38 has a low signal level as shown in FIG. 2. Since the switch S0 is turned on at the end of the pre-emission, the integrator 48 can start its integration. This may be done by turning the switch S0 on using an inverted signal of the output signal from the pre-emission pulse generator 31 and turning the switch off using the reset signal. During the main light pulse emissions by the LED 11, the output signal B of the differential amplifier 38 is inputted via the switch S0 to the integrator 48 and subjected to integration, as shown in FIG. 2. During this integration the pairs of switches S3 and S4, and S5 and S6 are alternately switched in response to the switching pulses P1 and P2. Therefore, the capacitor 53 is maintained charged irrespective of the polarity of the signal B. AFter completion of the light pulse emissions by the LED 11, the switch S0 is caused to turn off and the integration by the integrator 48 stops. The charged voltage Vout of the capacitor 53 at the end of the light pulse emissions is outputted as the integration signal E1. A similar integration operation is also performed by the first light receiving unit. In this case, the mask 18 is mounted on the light reception element 17 of the first light receiving unit so that the integration signal E2 comes to have a lower value in proportion to the object distance.

The integration signals E1 and E2 are inputted to the operation circuit 54 to generate the lens set position signal F which is then sent to the driver 58. In particular, first the object distance is obtained based on the ratio between the integration signals E1 and E2. Next, since the relationship between the integration ratio and the lens set position is known beforehand, the integration signal ratio is assigned to a particular lens set position.

Upon further depressing the release button, the driver 58 causes the taking lens 59 to move along the optical axis and stop at a predetermined position. After the taking lens is set at the predetermined position, the shutter is actuated to record the object image on the photographic film 60. After taking a picture, the camera control circuit outputs a picture taking finish signal so that the flip-flop 46 is reset so that the output state at the output terminals Q and $\overline{Q}$ is inverted, thereby turning on the switch S1 and turning off the switch S2 to set the differential amplifier at high gain (G1).

If an object is positioned in the distant range or it is an object of low reflectivity, the light reflected from the object will be very faint. In such a case, the output signal C of the comparator 50 takes an "L" level and the flip-flop 46 is not set because the output signal B of the differential amplifier 38 during pre-emission does not exceed the reference voltage Vc. Therefore, the switches S1 and S2 are maintained as shown in FIG. 1 so that the differential amplifiers 38 and 61 amplify the photoelectrically converted signal A with high gain (G1).

As will be appreciated from the above description, a pre-emission is performed once by the LED 11 just before the integration for the actual distance measurement. If the photoelectrically converted signal exceeds the predetermined level, the gains of the differential amplifiers 38 and 61 are switched to low gain. Thereafter, the integration starts and continues for a predetermined time so that the signal outputs of the differential amplifiers 38 and 61 are not saturated or the capacitor of the integrator 48 is not excessively charged, thereby to ensure a correct distance measurement.

The gains of the differential amplifiers 38 and 61 may be set at low gain (G1) in the ordinary state, and they may be switched to high gain (G2) if the photoelectrically converted signals during pre-emission reach no more than a predetermined level. Apart from this, as in the above embodiment, the DC component contained in the photoelectrically converted signal A is removed by the differential amplifiers 38 and 61. Also, the signals B of opposite polarity are alternately applied to the operational amplifiers 42 and 52 for the integration of the capacitor 53. As a result, the influence of offset voltages of the operational amplifiers 42 and 52 is cancelled out during the alternate application of the positive and negative signals B, thereby to ensure a highly precise distance measurement.

Figure 5:
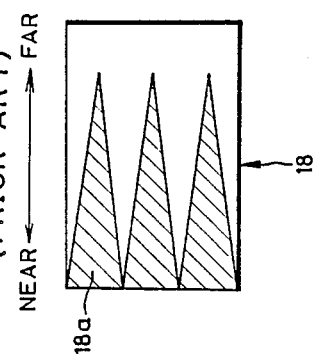
FIG. 5 illustrates an example of a conventional mask to be used with the apparatus shown in FIG. 4.
Figure 3:
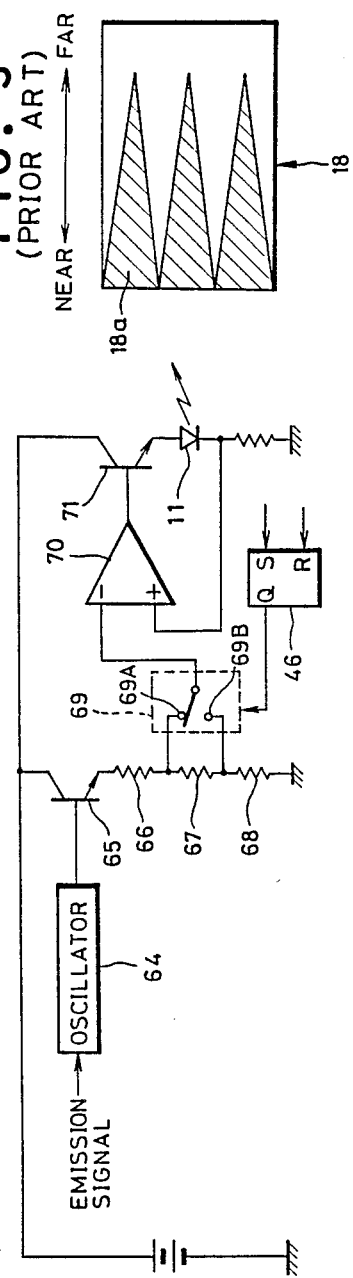
FIG. 3 is a circuit diagram showing an embodiment of the present invention wherein the light emission intensity of an LED is switched between two different values.

FIG. 3 illustrates another embodiment, wherein instead of changing the gain of the differential amplifier, the light emission intensity of the LED 11 is changed between two different values to prevent the saturation of the output signals of the differential amplifier and the integrator. An oscillator 64 responds to a light emission signal to generate, e.g., pulses of 5 KHz to make a transistor 65 turn on and off. A voltage divider comprised by resistors 66 to 68 is connected in series with the transistor 65. The movable contact of a switch 69 connects to a fixed contact 69B when a flip-flop 46 is set, and connects to a fixed contact 69A when the flip-flop 45 is reset. The fixed contact 69A is connected to a point between the resistors 66 and 67, whereas the fixed contact 69B is connected to a point between the resistors 67 and 68. As the movable contact of the switch 69 connects to the fixed contact 69A, a high voltage is inputted to an operational amplifier 70, whereas on the contrary as the movable contact of the switch 69 connects to the fixed contact 69B, a low voltage is inputted to the operational amplifier 70. The output terminal of the operational amplifier 70 is connected to the base of a transistor 71 to which an LED 11 is connected in series. This embodiment is used with the circuit shown in FIG. 1. However, the switches S1, S2 and the resistor 44 are not required, and so they are omitted.

When the voltage level of the output signal B of the differential amplifier 38 exceeds the reference voltage Vc, the flip-flop 46 is set so that the movable contact of the switch 69 is caused to connect to the fixed contact 69B. In this case, since the output signal of the operational amplifier 70 is small, current flowing through the LED 11 will be small. As a result, the LED 11 emits a low intensity light pulse so that the outputs of the differential amplifier and the integrator will not be saturated in the manner discussed in connection with the previous embodiment. Alternatively, if the flip-flop 46 is reset, the movable contact of the switch 69 is caused to connect to the fixed contact 69A so that the LED emits a high intensity light pulse and projects it onto the object to be photographed.

What is claimed is:

1. In a distance measuring apparatus wherein pulsating light having a predetermined period and emitted from light emitting means is projected upon an object, the pulsating light reflected from the object is photoelectrically converted by light receiving means to provide a first signal, and said first signal is integrated by integrating means, and the object distance is measured based on the integrated value; the improvement comprising:
    amplifying means for amplifying said first signal from said light receiving means and for outputting said amplified first signal as a second signal which is inputted to said integrating means;
    means for picking up said second signal generated in response to at least a first light pulse of said pulsating light and for judging the level of said second signal;
    means for adjusting the gain of said amplifying means in accordance with said level judged by said judging means; and
    means for causing said integrating means to start its integration after adjusting the gain of said amplifying means.

2. A distance measuring apparatus as defined in claim 1, wherein said means for adjusting the gain of said amplifying means effects adjustment between emissions of said first light pulse and a succeeding light pulse.

3. A distance measuring apparatus according to claim 1, wherein said judging means comprises a comparator for comparing said second signal with a reference voltage to output one of two different judgment signals.

4. A distance measuring apparatus according to claim 3, wherein said amplifying means comprises a first operational amplifier, a first resistor connected in a feedback path of said first operational amplifier, and a series combination of second and third resistors connected between said first resistor and said light receiving means.

5. A distance measuring apparatus according to claim 4, wherein gain adjusting means comprises a first switch coupling an interconnection between said second and third resistors and the input terminal of said first operational amplifier, a second switch coupling an interconnection between said third and first resistors and said input terminal of said first operational amplifier, and a flip-flop which is set in response to said judgment signal from said comparator and selectively turns on said first and second switches.

6. A distance measuring apparatus according to claim 5, further comprising a first capacitor connected between said light receiving means and said series resistor combination for removing the AC component of said first signal.

7. A distance measuring apparatus according to claim 6, wherein said integrating means comprises a second operational amplifier adapted to be inputted with said second signal, a second capacitor connected in a feedback path of said second operational amplifier, and means for causing said second capacitor to be charged irrespective of the charge/discharge of said first capacitor.

8. A distance measuring apparatus according to claim 7, wherein said second capacitor charging means comprises four bridge-connected switches, and means for turning on and off said four switches in synchronism with the light emission by said light projecting means.

9. In a distance measuring apparatus wherein pulsating light having a predetermined period and emitted from light emitting means is projected upon an object, the pulsating light reflected from the object is photoelectrically converted by light receiving means to provide a first signal, said first signal is integrated by integrating means, and the object distance is measured based on the integrated value; the improvement comprising:
    amplifying means for amplifying said first signal from said light receiving means and for outputting said amplified first signal as a second signal which is inputted to said integrating means;
    means for picking up said second signal generated in response to at least a first light pulse of said pulsating light and for judging the level of said second signal;
    means for adjusting the light intensity of said pulsating light emitted from said light emitting means in accordance with said signal level judged by said judging means; and
    means for causing said integrating means to start its integration after adjusting the gain of said amplifying means.

10. A distance measuring apparatus according to claim 9, wherein said light projecting means comprises an LED for emitting near-infrared rays.

11. A distance measuring apparatus according to claim 10, wherein said pulsating light intensity adjusting means comprises a transistor connected in series with said LED, and means for adjusting the current passing through the collector and the emitter of said transistor in accordance with said level judged by said judging means.

12. A distance measuring apparatus as defined in claim 11, wherein said means for adjusting the gain of said amplifying means effects adjustment between emissions of said first light pulse and a succeeding light pulse.

13. A distance measuring apparatus according to claim 11, wherein said judging means comprises a comparator for comparing said second signal with a reference voltage and for outputting one of two different judgment signals.

14. A distance measuring apparatus according to claim 13, further comprising a first capacitor connected between said light receiving means and said integration means for removing the AC component of said first signal.

15. A distance measuring apparatus according to claim 14, wherein said integrating means comprises a second operational amplifier adapted to be inputted with said second signal, a second capacitor connected in a feedback path of said second operational amplifier, and means for causing said second capacitor to be charged irrespective of the charge/discharge of said first capacitor.

16. A distance measuring apparatus according to claim 15, wherein said second capacitor charging means comprises four bridge-connected switches, and means for turning on and off said four switches in synchronism with the light emission by said light projecting means.

17. A distance measuring apparatus comprising:
means for projecting a predetermined number of light pulses at predetermined intervals upon an object;
first light receiving means spaced apart from said light projecting means by a predetermined distance, wherein a light pulse reflected from said object is incident upon a light receiving surface of said first light receiving means and the reflected light pulse is photoelectrically converted into a first photoelectrically converted signal;
a saw-toothed mask disposed in front of said light receiving surface whereby said first photoelectrically converted signal varies its amplitude in accordance with the incident position of said reflected light pulse;
a second light receiving means for photoelectrically converting said reflected light pulse from said object to output a second photoelectrically converted signal;
a first capacitor for passing only the AC component of said first photoelectrically converted signal;
a second capacitor for passing only the AC component of said second photoelectrically converted signal;
first amplifying means for amplifying said AC component passed by said first capacitor to output a first signal;
second amplifying means for amplifying said AC component passed by said second capacitor to output a second signal;
means for picking up said first photoelectrically converted signal generated in response to a pre-emission including at least a first light pulse among said light pulses and for judging the level of said picked up first photoelectrically converted signal;
means for adjusting the gains of said first and second amplifying means prior to a principal emission following said pre-emission in accordance with the signal level judged by said judging means;
first integrating means for integrating said first signal generated in response to said principal emission to output a first integration signal;
second integrating means for integrating said second signal generated in response to said principal emission following said pre-emission to output a second integration signal; and
means for obtaining an object distance based on a ratio between said first and second integration signals, and for controlling the position of a taking lens in accordance with the obtained object distance.

18. A distance measuring apparatus according to claim 17, wherein said first and second integrating means each comprise an operational amplifier, an integration capacitor connected in a feedback path of said operational amplifier, and means for causing said integration capacitor to be charged irrespective of the charge/discharge of said first capacitor.

19. A distance measuring apparatus according to claim 18, wherein said integration capacitor charging means comprises four bridge-connected switches, and means for turning on and off said four switches in synchronism with the light emission by said light projecting means.

20. A distance measuring apparatus comprising:
means for projecting a predetermined number of light pulses at predetermined intervals upon an object;
first light receiving means spaced apart from said light projecting means by a predetermined distance, wherein the light pulse reflected from said object is incident upon a light receiving surface of said first light receiving means and the reflected light pulse is photoelectrically converted into a first photoelectrically converted signal;
a saw-toothed mask disposed in front of said light receiving surface whereby said first photoelectrically converted signal varies its amplitude in accordance with the incident position of said reflected light pulse;
a second light receiving means for photoelectrically converting said reflected light pulse from said object to output a second photoelectrically converted signal;
a first capacitor for passing only the AC component of said first photoelectrically converted signal;
a second capacitor for passing only the AC component of said second photoelectrically converted signal;
first amplifying means for amplifying said AC component passed by said first capacitor to output a first signal;
second amplifying means for amplifying said AC component passed by said second capacitor to output a second signal;
means for picking up said first photoelectrically converted signal generated in response to a pre-emission including at least a first light pulse among said light pulses and for judging the level of said picked-up first photoelectrically converted signal;
means for adjusting the light emission intensity of said light projecting means prior to a principal emission following said pre-emission in accordance with the signal level judged by said judging means;
first integrating means for integrating said first signal generated in response to said principal emission to output a first integration signal;
second integrating means for integrating said second signal generated in response to said principal emission following said pre-emission to output a second integration signal; and
means for obtaining an object distance based on a ratio between said first and second integration signals, and for controlling the position of a taking lens in accordance with the obtained object distance.

* * * * *